(12) United States Patent
Margolin et al.

(10) Patent No.: US 12,481,716 B1
(45) Date of Patent: Nov. 25, 2025

(54) MODEL ENSEMBLE FOR MATCHING NEAREST SCRIPT TO A NEW SCRIPT PAGE

(71) Applicant: Intuit Inc., Mountain View, CA (US)

(72) Inventors: Itay Margolin, Tel Aviv (IL); Yoni Rabin, Tel Aviv (IL); Guy Shtar, Tel Aviv (IL); Andrei Roskach, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/222,922

(22) Filed: May 29, 2025

(51) Int. Cl.
*G06F 16/958* (2019.01)
*G06F 8/35* (2018.01)

(52) U.S. Cl.
CPC .............. *G06F 16/986* (2019.01); *G06F 8/35* (2013.01)

(58) Field of Classification Search
CPC ................................. G06F 16/986; G06F 8/35
See application file for complete search history.

(56) References Cited

U.S. PATENT DOCUMENTS

| | | | | |
|---|---|---|---|---|
| 10,649,740 | B2* | 5/2020 | Pistoia | G06F 16/986 |
| 2013/0097706 | A1* | 4/2013 | Titonis | G06F 21/566 |
| | | | | 726/22 |
| 2024/0370779 | A1* | 11/2024 | Neelakantan | G06N 3/045 |

* cited by examiner

*Primary Examiner* — Marina Lee
(74) *Attorney, Agent, or Firm* — Lathrop GPM LLP

(57) ABSTRACT

A method including extracting a number of page features from a web page. The number of page features represent an executable logic of the web page. The method also includes embedding, by a page feature embedding model, the number of page features to generate a page vector data structure. The method also includes comparing, by a comparison model, the page vector data structure and a number of script vector data structures to identify a selected script. Each of the number of script vector data structures is generated by a script feature embedding model processing computer executable program code of a corresponding script for performing a computer function on a web page. The method also includes presenting the selected script.

17 Claims, 6 Drawing Sheets

MODEL ENSEMBLE FOR MATCHING NEAREST SCRIPT TO A NEW SCRIPT PAGE

BACKGROUND

A script is a sequence of instructions or code (e.g., a "program") that can be executed by a computer, often without being compiled into a binary executable file. For example, a script may be a program or sequence of instructions that another program interprets or carries when the other program is executed by a computer processor, rather than the computer processor directly executing the script. Thus, a script may be a form of programming where the code is interpreted line by line and executed by another program in a runtime environment. Scripting languages may be designed to be easier to learn, relative to some programming languages. A script may be deemed "short" in some circumstances (e.g., less than a few hundred lines of code).

One example use for scripts is to extract data from a web page defined by hypertext markup language (HTML) code. However, web pages change constantly as web page owners change the look, feel, and content of web pages. Thus, a particular script programmed to extract data from a particular web page may suddenly cease being able to extract data from that particular web page.

Adjusting the particular script to once again extract data from that particular web page may not be a viable solution. The changes to the web page may be programmatically substantial (i.e., requiring structural or major programming changes to the script), making simple adjustments to the particular script impractical or impossible. Writing a new script to extract data from a changed web page may be time consuming, difficult, and costly.

While a body of scripts may be available for extracting a variety of different types of web pages, none of the available scripts are functional on the changed web page. Additionally, there is no direct relationship between a web page and a script that might be relatively easy to modify to extract data from that web page.

Thus, a technical problem can arise. The technical problem is designing a computer that can extract data from new and evolving websites through the use of automated scripts.

Current machine learning techniques cannot, given a new web page, identify such a script from a body of scripts. Thus, another technical problem arises. The other technical problem is how to build a machine learning model or ensemble that can perform the desired logic matching function (i.e., a machine learning model or ensemble capable of matching a script whose logic is closest, compared to other scripts in a body of scripts, to the logic of a web page defined in HTML or some other logical programming language).

SUMMARY

One or more embodiments provide for a method. The method includes extracting a number of page features from a web page. The number of page features represent an executable logic of the web page. The method also includes embedding, by a page feature embedding model, the number of page features to generate a page vector data structure. The method also includes comparing, by a comparison model, the page vector data structure and a number of script vector data structures to identify a selected script. Each of the number of script vector data structures is generated by a script feature embedding model processing computer executable program code of a corresponding script for performing a computer function on a web page. The method also includes presenting the selected script.

One or more embodiments also provide for a system. The system includes a computer processor and a data repository in communication with the computer processor. The data repository stores a number of page features from a web page. The number of page features represent an executable logic of the web page. The data repository also stores a page vector data structure. The data repository also stores a number of script vector data structures. Each of the number of script vector data structures contains a corresponding dataset representing a corresponding embedded definition of a corresponding executable script logic of a corresponding script in a number of scripts. The data repository also stores a selected script from among the number of scripts. Each of the number of scripts include computer executable program code for performing a computer function on the web page. The system also includes a page feature embedding model executable by the computer processor to embed the number of page features to generate the page vector data structure. The system also includes a comparison model executable by the computer processor on the page vector data structure and the number of script vector data structures to identify the selected script. The system also includes a server controller executable by the computer processor to extract the number of page features from the web page, and present the selected script identified by the comparison model.

One or more embodiments provide for a method of training a model ensemble. The method includes embedding, by a script feature embedding model, a number of sets of script features to generate a number of script vector data structures. Each of the number of sets of script features corresponds to one script vector data structure. The method also includes embedding, by a page feature embedding model, a number of page features to generate a number of page vector data structures. Each of the number of page features corresponds to one page vector data structure. The method also includes combining the number of page vector data structures and the number of script vector data structures to generate a number of combined vector data structures. Each page vector data structure in the number of page vector data structures is combined with one script vector data structure of a script encoded to execute a function on a page corresponding to the each page vector data structure. The method also includes generating, from the number of combined vector data structures and a loss function, a loss. The method also includes training, concurrently using the loss according to twin tower training, the script feature embedding model and the page feature embedding model.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1:
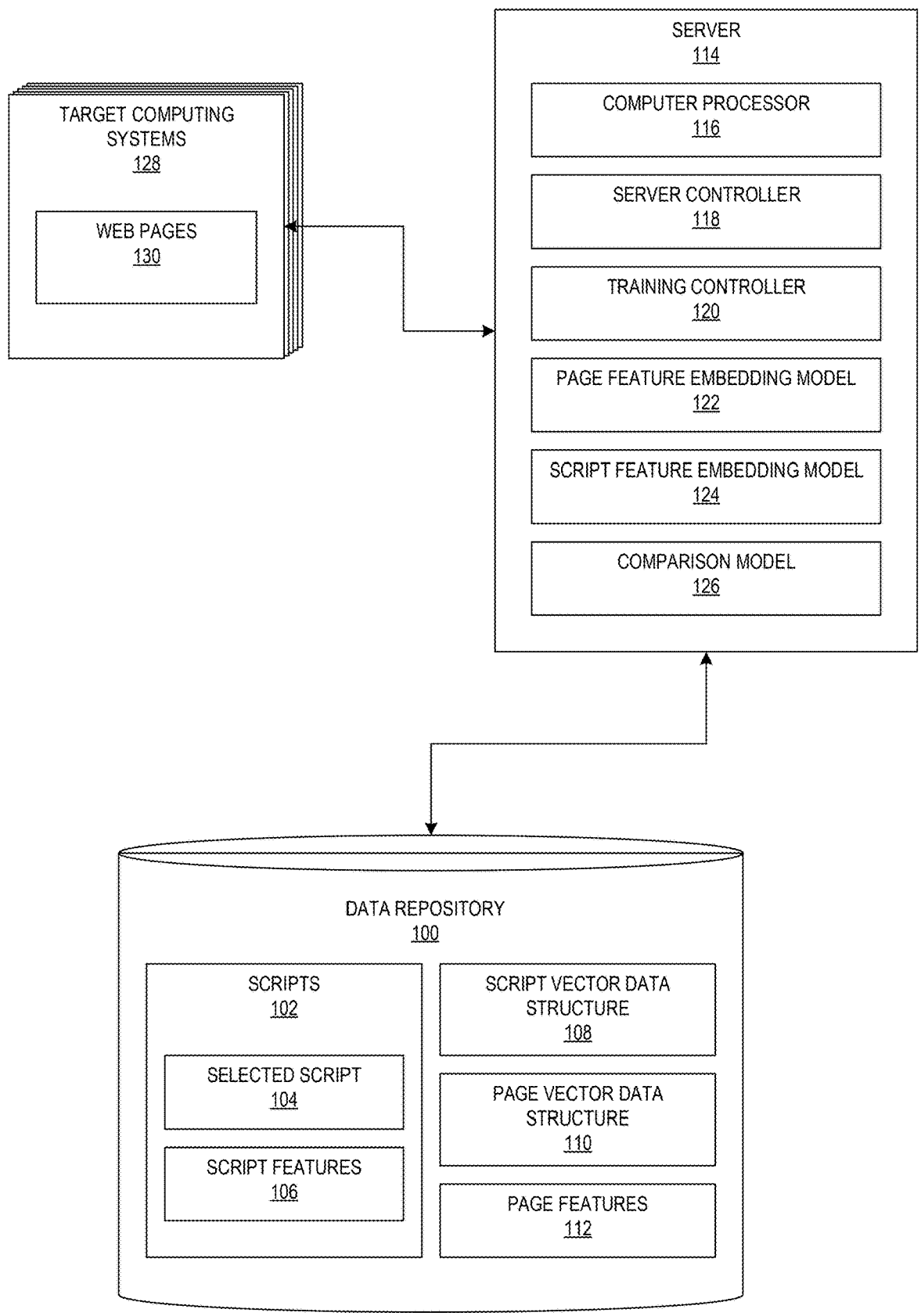
FIG. 1 shows a computing system, in accordance with one or more embodiments.

One or more embodiments are directed to an improved model ensemble for matching a nearest script having code that is closest, in terms of logical structure, to a new target code upon which the nearest script may execute after some modification. For example, one or more embodiments provide for training an improved embedding model ensemble and then using the embedding model ensemble to identify a nearest script in terms of script logic to a nearest web page in terms of the HTML logic of the web page.

Briefly, one or more embodiments provide for training specialized embedding machine learning models that embed the page code and the matching script code into vectors (i.e., page vectors and script vectors, respectively). The vectors store data that reflect the logic of the script code and page code.

The resulting vectors permit prediction of which script logic, among many available script logics, is the best suited to parse a given new target code. Additionally, the vectors permit an automatic determination (via additional models) whether a certain script logic will succeed and fail on a certain target logic. Still further, the vectors will permit still other models to determine how or why the logic of a script will fail to operate on a tew target code, and then correct the script logic automatically. Automatic correction may be performed, for example, by combining past logic examples in a manner that minimize the distance between the target logic and the script logic. The "distance" is a numerical value determined by a comparison machine learning model that indicates a similarity between two vectors.

In more detail, one or more embodiments employ a training technique known as twin tower training to train both a page feature embedding machine learning model (a "page feature embedding model) and a script feature embedding machine learning model (a "script feature embedding machine learning model). During training, scripts are converted into logic graphs, and then the logic of the graphs are extracted. The logic is then embedded into vectors (i.e., script vectors) suitable for input to the page feature embedding model. Additionally, example web pages upon which the scripts may correctly execute are converted into a logic embedding space by converting the logic of the HTML code defining the web pages into additional vectors (i.e., page vectors) suitable for input to a page feature embedding model. The page feature embedding model and the script feature embedding model are trained together in a twin tower training technique to generate trained embedding models (i.e., a trained page feature embedding model and a trained script feature embedding model). After training, the script vectors are stored for use during the inference face.

During the inference phase, a new web page is encountered. A script is to be selected, modified, or programmed to extract information from the new web page. However, none of the available scripts may extract information from the new web page.

Nevertheless, a selected script vector, closest in script logic to the HTML logic defining the new web page, may be selected from among the stored script vectors. To perform this task, the HTML code of the new web page is converted into a new page vector. The new page vector is compared using a comparison model to the various stored script vectors. Because the new page vector and the stored script vectors are both embedded in a logical structure space, the comparison model may identify which script vector is closest, in terms of logical structure, to the new web page. The matching may be performed even if none of the available script vectors will correctly execute on the new web page.

The script corresponding to the selected script vector is selected. The selected script is then modified, either automatically or by a computer scientist. After modification, the modified script then may be executed on the new web page to perform a desired function, such as to extract information automatically from the new web page.

Thus, one or more embodiments provide for a technical solution to the technical problem identified above. The technical solution is an improved machine learning model that matches a new website to one or more existing scripts for modification to be able to extract data from new and evolving websites. The technical solution, in more detail, includes building a machine learning model or ensemble that can perform a desired logic matching function (i.e., a machine learning model or ensemble capable of matching a script whose logic is closest, compared to other scripts in a body of scripts, to the logic of a web page defined in HTML or some other logical programming language).

The technical solution involves training new embedding models that are able to embed, in terms of computer readable features, the programming logic of scripts (the script feature embedding model), and the programming logic of the target code (e.g., the page feature embedding model). Once the models are trained, a body of script vectors embedding the programming logic of many vectors may be maintained. When a new target code is received (e.g., a new or changed web page is presented), then the target feature embedding model (e.g., the page feature embedding model) may embed the logic of the new target code as a target vector (e.g., a page vector).

Then, a comparison model (e.g., a logistic regression machine learning model) may compare the target vector (e.g., the page vector) to the set of script vectors. The output of the comparison model may be a set of probabilities that identifies the closest match, in the vector space, of one of the scripts to the target script.

The selected script will be closest, in terms of logic, to the target code. The selected script may be more easily modified or may be automatically modified to execute properly a function on the target code. For example, a selected data extraction script may be modified to execute correct data extraction on a new web page defined by HTML code.

Prior art models trained by the twin tower training method exist. For example, a contrastive language-image pretraining model (a CLIP model) may be trained using the twin tower training technique to concurrently process both images and text. For example, a CLIP model, during the inference phase, may receive an image as input and generate descriptive text, or may receive text as input and generate an image related to the text. However, CLIP models, and other types of models trained by the twin tower training technique, are incapable of generating vectors that embed information from scripts or target code into a logic space, as described above. In particular, CLIP models are trained to process text and images, not logical code.

Figure 2:
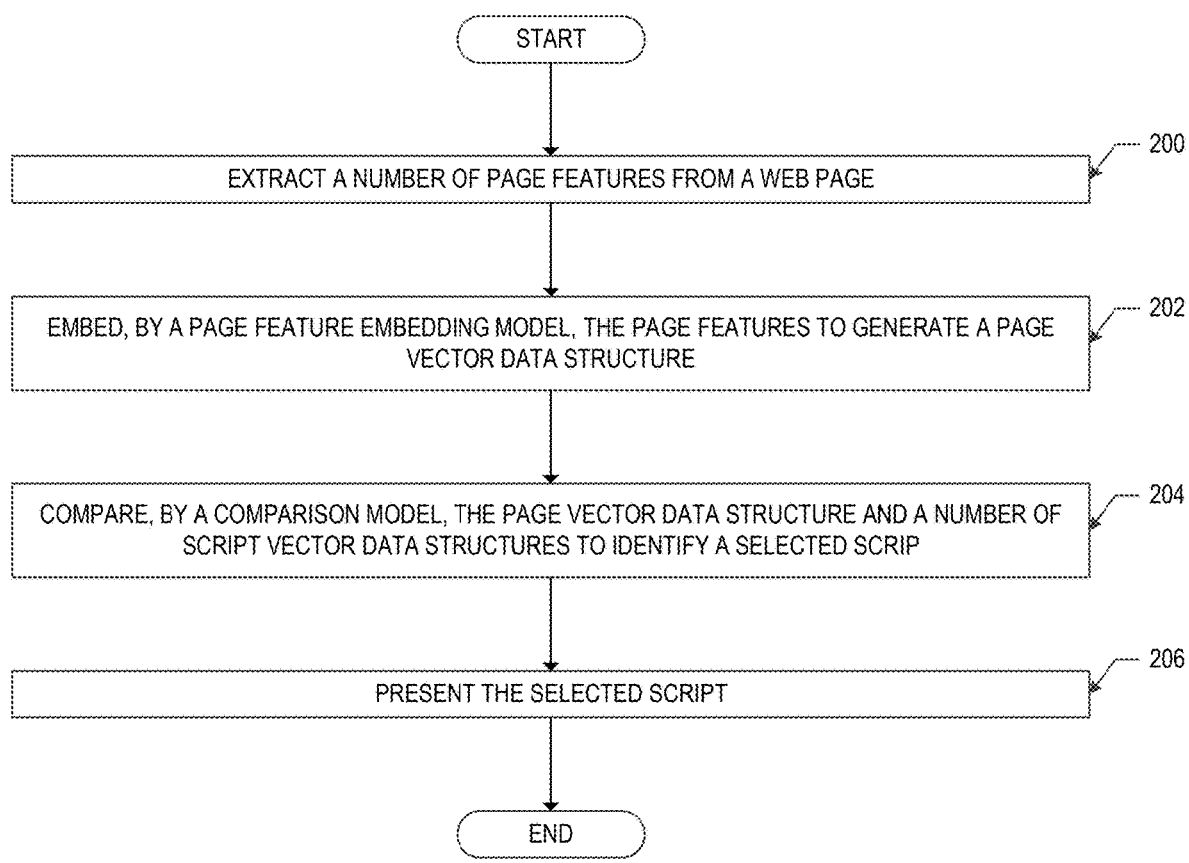
FIG. 2 and FIG. 3 show flowcharts of a method for an improved model ensemble for matching nearest script to a new script page, in accordance with one or more embodiments.
Figure 3:
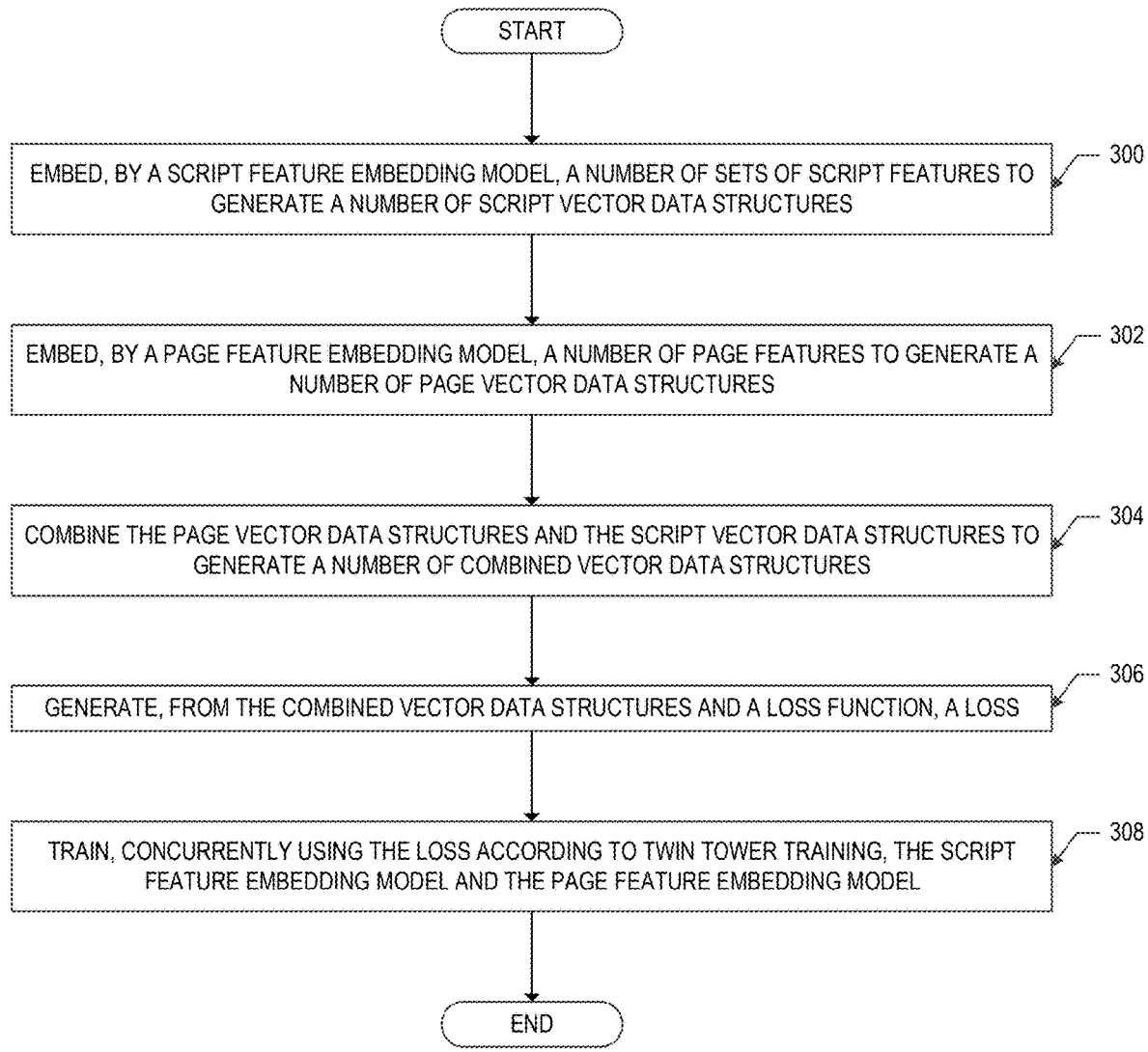
Figure 4:
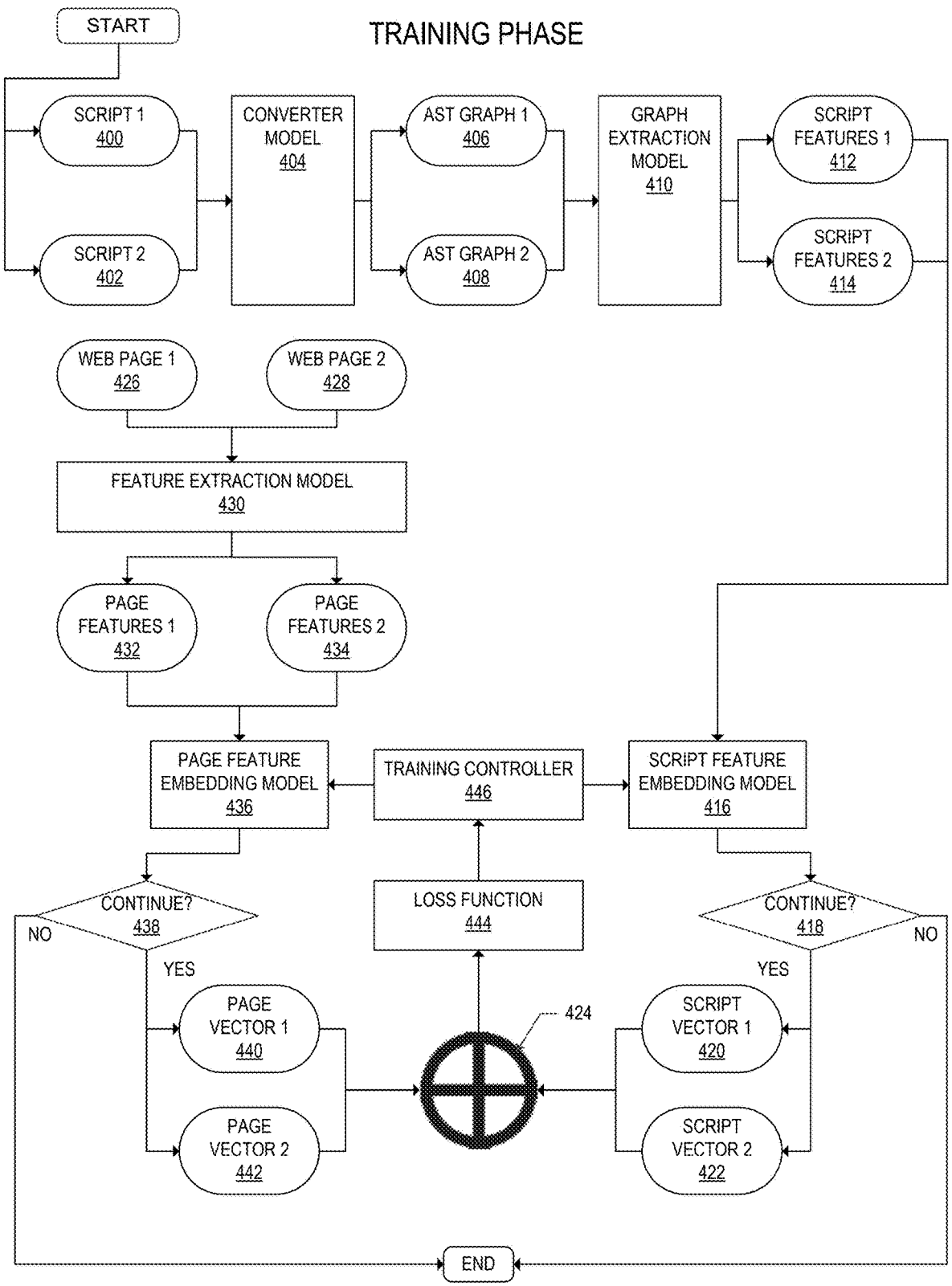
FIG. 4 shows an example of a training procedure for training an improved model ensemble for matching a nearest script to a new script page, in accordance with one or more embodiments.

However, the training techniques described in FIG. 2 through FIG. 4, show how to train a completely different kind of model (i.e., an embedding machine learning model) using a modified twin tower technique to correctly embed code into a vector containing data expressing the logic of scripts, web pages, etc. Thus, one or more embodiments are substantially different from known twin tower training techniques, and may be used to solve the technical problems identified above.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores one or more scripts (102). The term script corresponds to the standard definition used in the art of computer science. Specifically, a "script" is a sequence of instructions or code (e.g., a "program") that can be executed by a computer, often without being compiled into a binary executable file. In most cases, a script is read by some other computer program which is then executed by the computer processor, thereby executing the logic of the script on the computer. In an example, the scripts (102) are scripts programmed to extract data from specific web pages defined in hypertext markup language (HTML) code.

The scripts (102) include a selected script (104). The selected script (104) is a script that has been selected as being a particular script having a logic that is closest to a target logic of target code. For example, the selected script (104) may be a script that has a logic that is closest to the logic defining a new HTML web page. Identification of the selected script (104) is described with respect to FIG. 2 and exemplified by FIG. 5.

The scripts (102) also include a number of script features (106). A feature is a data element storable in a vector data structure. A vector is a type of data structure that stores data, typically a matrix defined by features (e.g., a category of data) and values for the features (e.g., a number that reflects the value of a corresponding category of data). In many cases, the matrix is a 1×N matrix where N represents the number of features and the values of each cell in the matrix represent the values of the features. Thus, each of the script features (106) is a type or category of data representable in a vector data structure. As described further below, the script features (106) and the corresponding values of the script features (106), taken together, may express the logic of the computer code that defines one of the scripts (102). An example of the script features (106) may be an "if-then" relationship between two lines of code. The presence of an "if-then" statement may be recorded by way of a number (e.g., "1"). Thus, the script vector data structure (108) (described below) would include an "if-then" feature having a value of "1."

The data repository (100) also stores a script vector data structure (108). A vector is as defined above with respect to the script features (106). Thus, the script vector data structure (108) is a computer readable data structure composed of script features (106) and values that expresses the logic of one of the scripts (102) in a logic embedding space. The term "embedding space" means that a particular vector encodes a particular category of information. In one or more embodiments, the logic embedding spaces encodes the logic of a script (or a page or other executable program) in the form of a vector (e.g., the script vector data structure (108)).

The data repository (100) also stores a page vector data structure (110). Again, a vector is as defined above. A page vector data structure (110) thus is a computer readable data structure composed of page features (112), defined below, and values that express the logic of one or more web pages. In an embodiment, the page vector data structure (110) may be expressed, instead, as a target code vector data structure. For example, if some other type of code other than HTML web pages is to be matched to the scripts (102), then the page vector data structure (110) instead may be referred to as a target vector data structure that embeds the logic of the target code in the logic embedding space.

The data repository (100) also stores a number of page features (112). The page features (112), like the script features (106), are a type or category of data representable in a vector data structure. As described further below, the page features (112) and the page vector data structure (110), taken together, may express the logic of the computer code that defines an HTML web page. However, as mentioned above, the page vector data structure (110) also may be expressed more generally as a target code vector data structure. In this case, the page features (112) may instead be referred to as target features or target code features. An example of one of the page features (112) may be, for example, a command to render text on a graphical user interface. The command may be stored as one of the page features (112), and the presence of the command recorded by the value of "1" for the command page feature.

The system shown in FIG. 1 may include other components. For example, the system shown in FIG. 1 also may include a server (114). The server (114) is one or more computer processors, data repositories, communication devices, and supporting hardware and software. The server (114) may be in a distributed computing environment. The server (114) is configured to execute one or more applications, such as the server controller (118), the training controller (120), the page feature embedding model (122), the script feature embedding model (124), and the comparison model (126). An example of a computer system and network that may form the server (114) is described with respect to FIG. 6A and FIG. 6B.

The server (114) includes a computer processor (116). The computer processor (116) is one or more hardware or virtual processors which may execute computer readable program code that defines one or more applications, such as the server controller (118), the training controller (120), the page feature embedding model (122), the script feature embedding model (124), and the comparison model (126). An example of the computer processor (116) is described with respect to the computer processor(s) (602) of FIG. 6A.

The server (114) also includes a server controller (118). The server controller (118) is software or application specific hardware which, when executed by the computer processor (116), controls and coordinates operation of the software or application specific hardware described herein. The server controller (118) also may control and coordinate execution of the page feature embedding model (122) and the comparison model (126) during an inference phase. Thus, the server (114) may execute the method of FIG. 2 through FIG. 5.

The server (114) also may include a training controller (120). The training controller (120) is software or application specific hardware which, when executed by the computer processor (116), trains one or more machine learning models (e.g., the page feature embedding model (122), the script feature embedding model (124), and the comparison model (126)). An example of the training controller (120) is described in more detail with respect to FIG. 3 and FIG. 4.

The server (114) also includes a page feature embedding model (122). The page feature embedding model (122) is an embedding machine learning model that is trained to convert data (e.g., an AST logic graph or HTML code) into a vector data structure composed of features and values that reflect the logic of the computer code that defines the page (or the target code). An example of the page feature embedding model (122) may be a node embedding model (e.g., Node2Vec and GraphSAGE), a knowledge graph embedding model (e.g., TransE, TransR, DistMult), text embedding models (e.g., Word2Vec, GloVe, etc.). Use of the page feature embedding model (122) is described with respect to FIG. 2 through FIG. 5.

The server (114) also includes a script feature embedding model (124). The script feature embedding model (124) is an embedding machine learning model that is trained to convert data (e.g., an AST logic graph or other script code) into a vector data structure composed of features and values that reflect the logic of the computer code that defines the script. An example of the script feature embedding model (124) may be a node embedding model (e.g., Node2Vec and GraphSAGE), a knowledge graph embedding model (e.g., TransE, TransR, DistMult), text embedding models (e.g., Word2Vec, GloVe, etc.). In an embodiment, the script feature embedding model (124) may be the same type of model as the page feature embedding model (122). Use of the script feature embedding model (124) is described with respect to FIG. 2. An example use of the script feature embedding model (124) is described with respect to FIG. 3 through FIG. 5.

However, after training, the page feature embedding model (122) will not be the same as the script feature embedding model (124) because the weights and parameters of the two models will be different. Thus, the two models (the page feature embedding model (122) and the script feature embedding model (124)) will be trained to particularly operate on their respective intended inputs (logic graphs, code types, HTML code, other web page encoding, etc.). Thus, for example, the page feature embedding model (122) would not be appropriate to embed the code of scripts, because the page feature embedding model (122) is trained to embed the logic of the code defining web pages. Similarly, the script feature embedding model (124) would not be appropriate to embed the logic of HTML code of web pages, or of other target code, because the script feature embedding model (124) is trained to embed the logic of the code defining web pages.

The server (114) also may include a comparison model (126). The comparison model (126) is a machine learning model trained to take, as input, the script vector data structure (108) and the page vector data structure (110) and to determine a probability that the script vector data structure (108) matches the page vector data structure (110). The closer the probability is to "1" (i.e., 100%), the closer the two vectors match each other. Because both vectors are in a logic embedding space, the comparison model (126) may effectively match one of the script vector data structures (108) to a page vector data structure (110). Examples of the comparison model (126) include a logistic regression model, a K-nearest neighbor model, a cosine similarity model, etc.

In this manner, the logic defining a new target code (e.g., an HTML web page) may be matched to one of the scripts (102). In particular, the script vector data structure (108) that has the highest probability of match is closest in logical code to the page vector data structure (110). That script vector data structure (108) corresponds to the selected script (104). The selected script (104) then may be used, or modified and then used, to perform the desired function (e.g., data extraction) on the target code (e.g., a new web page).

The system shown in FIG. 1 also may include one or more target computing systems (128). The target computing systems (128) are computing systems (e.g., the computing system (600) shown in FIG. 6A) that communicate with the server (114).

The target computing systems (128) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

The target computing systems (128) may host one or more web pages (130). The web pages (130) may be one or more of the web pages for which the page features (112) may be extracted and embedded in the page vector data structure (110). The web pages (130) may be hosted on a variety of disparate computers owned by a variety of third parties. For example, the target computing systems (128) may be servers operated by financial institutions, and the web pages (130) may be coded to display financial information for individual accounts at the financial institutions. The scripts (102), in this case, may be coded to extract financial information from the web pages, and then to use that financial information to perform financial management operations by the owner of the server (114).

While FIG. 1 shows a configuration of components, other configurations may be used without departing from the scope of one or more embodiments. For example, various components may be combined to create a single component. As another example, the functionality performed by a single component may be performed by two or more components.

FIG. 2 and FIG. 3 show flowcharts of a method for an improved model ensemble for matching nearest script to a new script page, in accordance with one or more embodiments. The methods of FIG. 2 and FIG. 3 may be implemented using the system of FIG. 1 and one or more of the steps may be performed on or received at one or more computer processors. In particular, FIG. 2 is a method of using a trained page embedding model to identify a nearest script to a page. FIG. 3 is a method of training a page feature embedding model and a script feature embedding model, both of which have either or direct or indirect uses during the method of FIG. 2.

The method of FIG. 2 may be characterized as a method of identifying a selected script, from among a number of different scripts, such that the selected script has an executable logic that is similar to an executable logic of a target program. In particular, the method of FIG. 2 may be characterized as a method of identifying a selected script, from among a number of different scripts, such that the selected script has an executable logic that is similar to the executable logic of a web page defined by executable HTML code.

Step 200 includes extracting a number of page features from a web page. The number of page features represent an executable logic of the web page. The page features may be extracted by a feature extraction model, such as a graph extraction model or some other model that identifies words or structures of the target code (e.g., HTML web page) and parses the page features. Because HTML code is expressed in a nested format, the logic of the code may be, in some cases, read directly from the code itself. However, the HTML code or other target code could be converted into a graph data structure (see the AST graph defined below with respect to FIG. 4). Then, a node or graph feature extractor could be used to extract features (nodes and edges identifying the relationships between the nodes) as the page features from the web page (or the target features of the target code).

Step 202 includes embedding, by a page feature embedding model, the number of page features to generate a page vector data structure. Embedding may be performed by providing the features extracted at step 200 as input to the page feature embedding model. The output of the page feature embedding model is the page vector data structure. Operation of the page feature embedding model depends on the type of embedding model being used. However, the page feature embedding model is trained as described with respect to FIG. 3 and as exemplified in FIG. 4.

Step 204 includes comparing, by a comparison model, the page vector data structure and a number of script vector data structures to identify a selected script. Comparing is performed by providing, as input, the page vector data structure and the number of script vector data structures to the comparison model. The output of the comparison model is a series of probabilities associated with each of the script vector data structures. Alternatively, the output of the comparison model may be the script vector data structure that is closest in distance to the page vector data structure. Again, the distance represents a closeness between the values of the features in the two vectors being compared (i.e., the page vector data structure and one of the script vector data structures). The exact operation of the comparison model depends on the type of comparison model (e.g., logistic regression model, K-nearest neighbor model, cosine similarity model, etc.).

In an embodiment, each of the script vector data structures includes a corresponding dataset representing a corresponding embedded definition of a corresponding executable script logic of a corresponding script in a number of scripts. In other words, each script vector data structure has an associated script having an executable script logic. In the embodiment, each of the scripts includes computer executable program code for performing a computer function on the web page. For example, the function may be to extract data from a page, transform some data from the page, etc.

Step 204 may be expanded. For example, the method of FIG. 2 also may include generating a number of script vector data structures. The script vector data structures may be generated by first extracting a number of script features from the number of scripts. The script features may be extracted as described with respect to step 200, but with respect to scripts rather than with respect to web pages. Alternatively, the script features may be extracted as shown in the example of FIG. 4 (i.e., converting the script logic into an AST graph (defined in FIG. 4) and then using a graph embedding model to convert the graph into a script vector data structure. In any case, the method then includes embedding, by a script feature embedding model, the number of script features to generate a number of script vector data structures.

In another variation, step 204 may include executing the comparison model to output a number of nearest scripts that have the nearest executable script logics to the executable logic of the web page. Then, the method may include selecting a subset of the number of nearest scripts. The subset may be presented (e.g., shown on a graphical user interface, stored, provided to another process, etc.). The method then may include receiving, as the selected script, a selection from among the subset to identify the selected script.

Step 204 includes presenting the selected script. Presenting may include displaying the selected script on a graphical user interface (GUI). Presenting may include storing the selected script. If the script is ready for execution on the web page, then presenting may include executing the selected script on a web page. In this case, executing the selected script generates web page data representing information displayed on the web page when the executable logic of the web page is executed. For example, executing the selected script on a web page may perform a screen scraping function (e.g., optical character recognition, HTML code readers, etc.) in order to extract information of interest for later use by other applications.

In yet another embodiment, presenting also may include storing the web page data in a non-transitory computer readable storage medium. In still another embodiment, presenting may include executing a data processing application on the web page data. Other variations are also possible.

The method of FIG. 2 may be modified, such as by including more, fewer, or different steps. For example, the method FIG. 2 also may include the step of modifying, after presenting, a selected executable code of the selected script to generate a modified script. In the example, the selected script, prior to modifying, is inoperable on the web page. Thus, presenting at step 206 may include executing the modified script on the web page.

Attention is now turned to FIG. 3. As indicated above, FIG. 3 is a method of training a model ensemble, including a page feature embedding model and a script feature embedding model, both of which have either direct or indirect uses during the method of FIG. 2. Step 300 includes embedding, by a script feature embedding model, a number of sets of script features to generate a number of script vector data structures. Each of the number of sets of script features corresponds to one script vector data structure. Embedding may be performed, as explained, with respect to the variation described in step 204 of FIG. 2. Embedding also may be performed as shown in FIG. 4.

Step 302 includes embedding, by a page feature embedding model, a number of page features to generate a number of page vector data structures. Each of the number of page features corresponds to one page vector data structure. Embedding may be performed as described with respect to step 202 of FIG. 2.

Step 304 includes combining the number of page vector data structures and the number of script vector data structures to generate a number of combined vector data structures. Combining may be performed by a number of different vectors. For example, the page vector data structure and each script vector data structure may be combined using a dot product function. In this manner, a number of combined vector data structures are generated equal to the number of page vector data structures. In other words, each page vector data structure in the page vector data structures is combined with one script vector data structure of a script encoded to execute a function on a page corresponding to each page vector data structure.

Step 306 includes generating, from the number of combined vector data structures and a loss function, a loss. Generating a loss is performed by executing a loss function on the combined vector data structures. The loss function compares the combined vector data structures to known combined vector data structures that accurately reflect embedding space relationships between scripts and pages. The output of the loss function is a number or a set of numbers that are then used to modify the parameters of both the page feature embedding model and the script feature embedding model.

Step 308 includes training, concurrently using the loss according to twin tower training, the script feature embedding model, and the page feature embedding model. For example, as exemplified in FIG. 4, the same loss is applied to the page feature embedding model and the script feature embedding model. While the same loss is applied, the calculation output of the two models is not the same, because the inputs to the models are different. See, for example, FIG. 4.

The method of FIG. 3 may be varied. For example, the method also may include converting a number of scripts to a corresponding number of graphs. Each of the scripts corresponds to one graph. Each of the scripts are encoded to execute the function. Then, the method may include extracting the number of sets of script features from the corresponding number of graphs. Each graph corresponds to one set of script features. The script features then may be extracted from the graphs. See FIG. 4 for an example.

In another variation of FIG. 3, the method also may include extracting the number of page features from a number of web pages. The page features then may be embedded into the page vector data structures using the page feature embedding model.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

FIG. 4 shows an example of training an improved model ensemble for matching a nearest script to a new script page, in accordance with one or more embodiments. The following example is for explanatory purposes only and not intended to limit the scope of one or more embodiments. FIG. 4 may be considered a variation of FIG. 3, and may be executed using the system of FIG. 1. FIG. 4 shows a twin tower training technique, because the page feature embedding model (436) and the script feature embedding model (416) are trained together concurrently.

The training method starts when scripts, such as script 1 (400) and script 2 (402), are provided as input to a converter model (404). The converter model (404) is a machine learning model trained to convert the computer code of the scripts into an abstract syntax tree (AST) graph. The AST graph represents the logic of each script in graph format where nodes are objects or functions upon which the script code operates and the edges of the graph are the relationships between the nodes. The relationships may be functions or the logical relationships between code elements. Thus, the output of the converter model (404) is a AST graph 1 (406), corresponding to the script 1 (400), and a AST graph 2 (408), corresponding to the script 2 (402).

In turn, the AST graph 1 (406) and the AST graph 2 (408) are provided as input to a graph extraction model (410). The graph extraction model (410) is a machine learning model trained to convert the nodes and edges of the graph into features. Thus, the output of the graph extraction model (410) is script features 1 (412), corresponding to the AST graph 1 (406), and script features 1 (412), corresponding to the AST graph 2 (408).

The features are then provided to a script feature embedding model (416). Thus, the script features 1 (412) and the script features 2 (414) are provided to the script feature embedding model (416). FIG. 4 shows a continue decision (418). However, initially, the first time the script features are provided to the script feature embedding model (416), the continue decision (418) is automatically "yes" (i.e., proceed). Thus, the script feature embedding model (416) outputs script vectors, including script vector 1 (420) (corresponding to script features 1 (412)) and script vector 2 (422) (corresponding to script features 2 (414)). The script vector are script vector data structures, as described with respect to FIG. 1.

Attention is now turned to the other side of the twin tower training flow. In particular, a number of web pages, such as web page 1 (426) and web page 2 (428), are provided as input to a feature extraction model (430). The feature extraction model (430) operates as descried with respect to FIG. 3 by extracting features from the HTML code of the pages. Thus, the output of the feature extraction model (430) is a number of page features, such as page features 1 (432) and page features 2 (434).

However, in an alternate embodiment, the web page features (or other target code features) may be extracted from AST graphs. Thus, for example, the web pages or other target code may be provided to a converter model (e.g., the converter model (404)) in order to generate AST graphs. In this case, the feature extraction model (430) may be replaced by the graph extraction model (410).

In any case, page features are extracted. The page features are then provided as input to the page feature embedding model (436). FIG. 4 shows a continue decision (438). However, initially, the first time the page features are provided to the page feature embedding model (436), the continue decision (438) is automatically "yes" (i.e., proceed). Accordingly, the output of the page feature embedding model (436) is a number of page vectors. In the example, the output of the page feature embedding model (436) is a page vector 1 (440), corresponding to the page features 1 (432), and a page vector 2 (442), corresponding to the page features 2 (434).

Continuing the training method, the page vectors are combined with the script vectors on a one-for-one basis using a combination function (424). Each page vector is combined with a corresponding script vector that corresponds to a script that is known to execute correctly (or known to execute incorrectly) on the corresponding page vector. In the example, the page vector 1 (440) is combined with the page vector 1 (440) to generate one combined vector. The page vector 2 (442) is combined with the script vector 2 (422) to generate another combined vector. In another embodiment, multiple scripts may be associated with each vector. Thus, for example, it is possible that the page vector 1 (440) is combined with the script vector 1 (420) and then combined again with the script vector 2 (422) to generate two separate combined vectors.

The combination is performed by combination function (424). The combination function (424), for example, may be a dot product function. Thus, for example, a combined vector may be a dot product of the page vector 1 (440) and the script vector 1 (420).

The combined vector is provided to a loss function (444). The loss function (444) may be, for example, a minimization function that minimizes a loss:

$$\text{loss} = y*\log(\hat{y}) + (1-y)*\log(1-\hat{y}).$$

In this case, y is the combined vector data structure. The value of "y" is "1" if the web page (represented by the page vector data structure) was successfully processed by the corresponding script (represented by the script vector data structure). Otherwise, the value of "y" is zero ("0").

The loss output by the loss function (444) is then provided to a training controller (446). The training controller (446) may be the training controller (120) of FIG. 1. The training controller (446) may use the loss to modify the weights or parameters of both the page feature embedding model (436) and the script feature embedding model (416). However, because the inputs to the page feature embedding model (436) (i.e., the page features 1 (432) and the page features 2 (434)) are different than the inputs to the script feature embedding model (416) (i.e., the script features 1 (412) and the script features 2 (414)), the outputs of the two models on subsequent training steps will remain different.

At this point, the continue steps at continue decision (418) and continue decision (438) are evaluated. If convergence has occurred for both models, then the continue step at both continue decision (418) and continue decision (438) will be "no." In this case, the process terminates. However, if convergence of both models has not occurred, then the training procedure described above is repeated. Nevertheless, in an embodiment, each new training step may begin with the script features and the page features already generated as described above, as opposed to re-extracting graphs and features to regenerate the script features and the page features.

Convergence may occur when the loss function (444) outputs a loss that results in less than a predetermined change in the parameters or weights of the page feature embedding model (436) or the script feature embedding model (416). Alternatively, convergence may occur when the page feature embedding model (436) and the script feature embedding model (416) achieve a predetermined accuracy (e.g., 99%) when converting a feature to a corresponding data structure. The accuracy may be evaluated because true vector data structures may be known and compared to the vector data structures output by the script feature embedding model (416) and the page feature embedding model (436).

Figure 5:
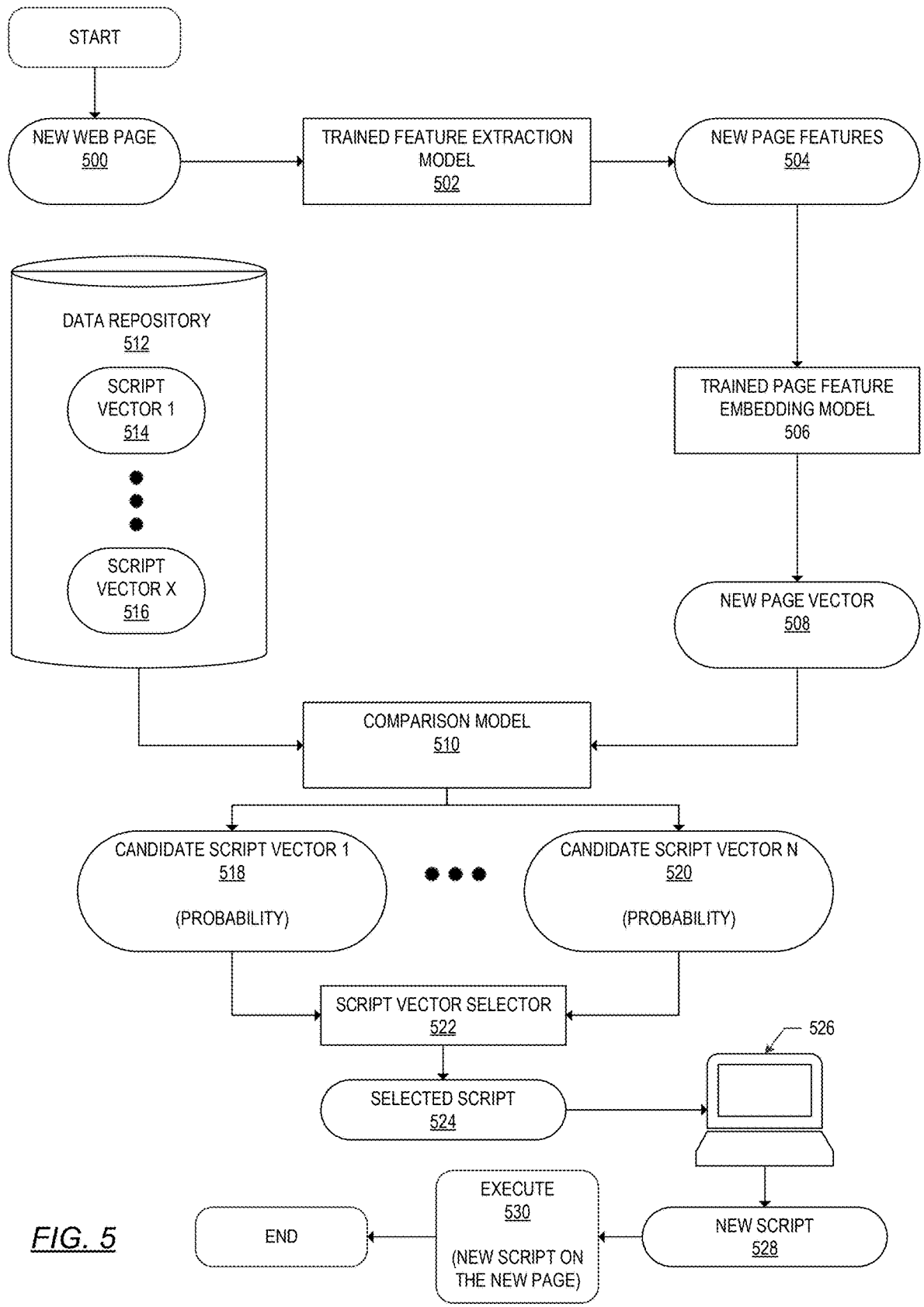
FIG. 5 shows an example of an inference phase for using an improved model ensemble for matching a nearest script to a new script page, in accordance with one or more embodiments.

FIG. 5 shows an example of using an improved model ensemble for matching a selected script to a new script page. FIG. 5 represents an inference phase of using the page feature embedding model and the script feature embedding model trained in FIG. 4.

Initially, a new web page (500) is provided as input to a trained feature extraction model (502). The trained feature extraction model (502) may be the feature extraction model (430) of FIG. 4. The output of the trained feature extraction model (502) is the number of new page features (504).

In turn, the new page features (504) are provided to a trained page feature embedding model (506). The trained page feature embedding model (506) may be the page feature embedding model (436) of FIG. 5. The output of the trained page feature embedding model (506) is a new page vector (508), which may be, for example, the script vector 1 (420) or the script vector 2 (422) of FIG. 4.

The new page vector (508) is then provided as input to a comparison model (510). The comparison model (510) may be the comparison model (126) of FIG. 1. A number of scripts (e.g., script vector 1 (514) through script vector X (516)) stored in a data repository (512) are also provided as input to the comparison model (510). The comparison model (510) compares, on a one-for-one basis, each of the script vectors to the new page vector (508).

The comparison model (510) outputs a number of candidate script vectors, such as candidate script vector 1 probability (518) through candidate script vector N probability (520). Each candidate script vector is a script vector associated with a probability generated by the comparison model (510). The comparison model (510) represents the nearness, in terms of logic embedding space, of the new page vector (508) to the corresponding candidate script vector.

The candidate script vectors are provided to a script vector selector (522), which may be a machine learning model or a simple extraction rule. For example, an extraction rule may be to select the candidate script vector (from among the candidate script vector 1 probability (518) through the candidate script vector N probability (520)) that has the highest probability (i.e., is nearest in the logic embedding space) of matching the new page vector (508).

The output of the script vector selector (522) is a selected script (524). The selected script (524) is a script that corresponds to the candidate script vector that had the highest probability (or was nearest in the logic embedding space to the new page vector (508)). In an embodiment, multiple selected scripts in the data repository (512) may be presented as the selected script (524) (e.g., multiple possible scripts may be close in the logic embedding space to the logic defining the new web page (500)).

In the embodiment, the selected script (524) is not operational to perform a function on the new web page (500). However, the logic of the selected script (524) is close to a logic that could be used to perform a desired function on the new web page (500). For example, the logic of the selected script (524) may have programming syntax issues, or may need an additional function, a different function, or fewer functions in order to execute the desired function on the new web page (500).

Thus, the selected script (524) is provided to a computer (526). The computer (526) may be programmed to automatically adjust the selected script (524). For example, a machine learning model can predict where the logic of the selected script (524) may fail when applied to the new web page (500). Logic or code strings from other scripts that are known to perform the specific desired functions may then be automatically inserted into the logic or code of the selected script (524) at the predicted point of failure. Alternatively, the computer (526) could combine logic examples in various scripts stored in the data repository (512) by minimizing a distance (in the logic embedding space) between the script snippets and the new web page (500). The computer (526) may then combine the different script snippets into a new script that is functional on the new web page (500).

In yet another embodiment, the selected script (524) (or multiple selected scripts) may be displayed on a graphical user interface to a user who is a computer programmer or computer scientist. The user then can adjust the program code of the selected script (524) in order to make the selected script (524) executable on the new web page (500).

In any case, the computer (526) outputs a new script (528). The new script (528) is then executed at the execute new script (530) step shown in FIG. 5. The desired function is performed on the new web page (500), such as, for example, to extract data automatically from the new web page (500). In an embodiment, the method of FIG. 5 may terminate thereafter.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
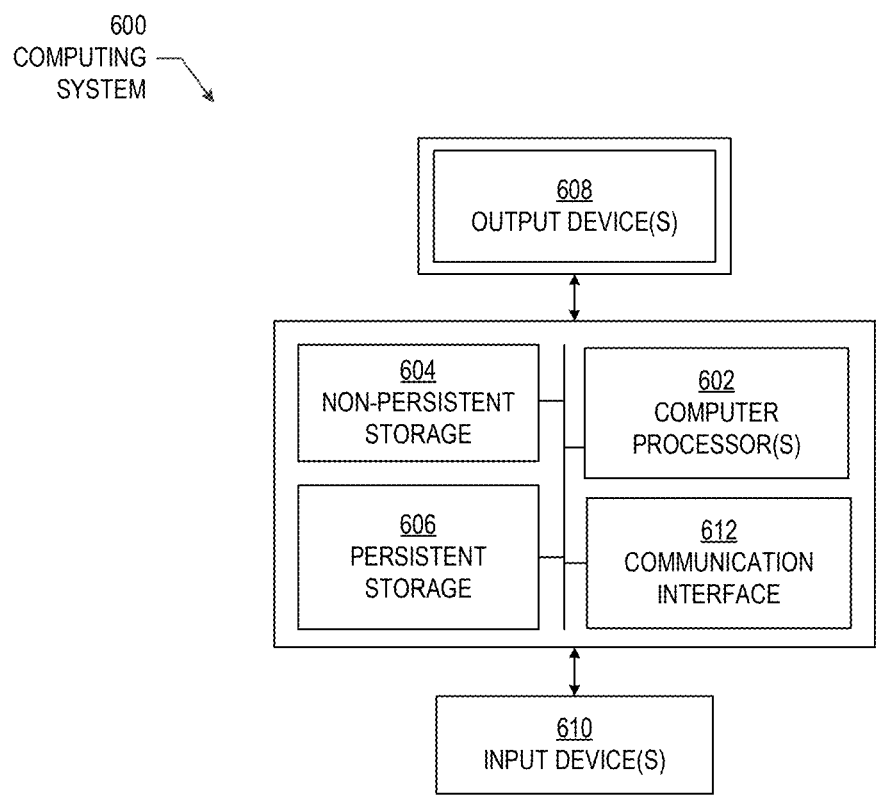
FIG. 6A and FIG. 6B show a computing system and network environment, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN), such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
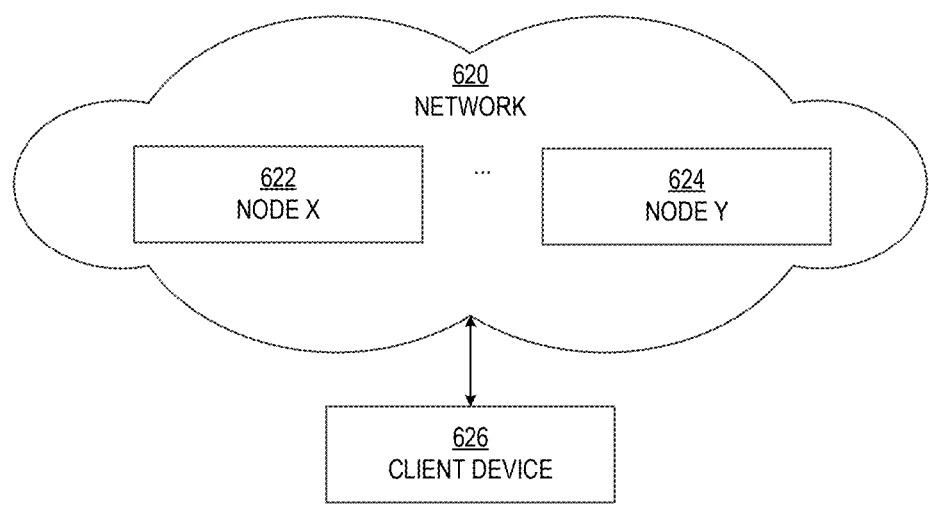

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    extracting a plurality of page features from a web page, wherein the plurality of page features represent an executable logic of the web page;
    embedding, by a page feature embedding model, the plurality of page features to generate a page vector data structure;
    comparing, by a comparison model, the page vector data structure and a plurality of script vector data structures to identify a selected script, wherein:
        each of the plurality of script vector data structures is generated by a script feature embedding model processing computer executable program code of a corresponding script for performing a computer function on a web page; and
    presenting the selected script.

2. The method of claim 1, wherein presenting comprises extracting, by the selected script, data from the web page when executing the computer executable program code in the script.

3. The method of claim 2, wherein executing the selected script generates web page data representing information displayed on the web page when the executable logic of the web page is executed.

4. The method of claim 3, further comprising:
    storing the web page data in a non-transitory computer readable storage medium.

5. The method of claim 3, further comprising:
    executing a data processing application on the web page data.

6. The method of claim 1, further comprising:
    modifying, after presenting, a selected executable code of the selected script to generate a modified script.

7. The method of claim 6, wherein the selected script, prior to modifying, is inoperable on the web page.

8. The method of claim 6, wherein presenting comprises executing the modified script on the web page.

9. The method of claim 1, further comprising generating the plurality of script vector data structures by:
    extracting a plurality of script features from the plurality of scripts; and
    embedding, by a script feature embedding model, the plurality of script features to generate the plurality of script vector data structures.

10. The method of claim 1, wherein executing the comparison model to identify the selected script comprises:
    executing the comparison model to output a nearest script that has a nearest executable script logic to the executable logic of the web page.

11. The method of claim 1, wherein executing the comparison model to identify the selected script comprises:
    executing the comparison model to output a plurality of nearest scripts that have nearest executable script logics to the executable logic of the web page;
    selecting a subset of the plurality of nearest scripts;
    presenting the subset; and
    receiving, as the selected script, a selection from among the subset to identify the selected script.

12. A system comprising:
    a computer processor;
    a data repository in communication with the computer processor and storing:
        a plurality of page features from a web page, wherein the plurality of page features represent an executable logic of the web page,
        a page vector data structure,
        a plurality of script vector data structures, wherein each of the plurality of script vector data structures contains a corresponding dataset representing a corresponding embedded definition of a corresponding executable script logic of a corresponding script in a plurality of scripts,
        a selected script from among the plurality of scripts, wherein each of the plurality of scripts comprise computer executable program code for performing a computer function on the web page;
    a page feature embedding model executable by the computer processor to embed the plurality of page features to generate the page vector data structure;
    a comparison model executable by the computer processor on the page vector data structure and the plurality of script vector data structures to identify the selected script; and
    a server controller executable by the computer processor to:
        extract the plurality of page features from the web page, and
        present the selected script identified by the comparison model.

13. The system of claim 12, wherein:
    presenting comprises executing the selected script on the web page,
    executing the selected script generates web page data representing information displayed on the web page when the executable logic of the web page is executed, and
    the server controller is further executable by the computer processor to:
        store the web page data in a non-transitory computer readable storage medium, and
        execute a data processing application on the web page data.

14. The system of claim 12, wherein the server controller is further executable by the computer processor to:
    modify, after presenting, a selected executable code of the selected script to generate a modified script, wherein:
        the selected script, prior to modifying, is inoperable on the web page, and
        presenting comprises executing the modified script on the web page.

15. The system of claim 12, wherein the server controller is further executable by the computer processor to extract a plurality of script features from the plurality of scripts, and wherein the system further comprises:
    a script feature embedding model executable by the computer processor to generate the plurality of script vector data structures by embedding the plurality of script features to generate the plurality of script vector data structures.

16. The system of claim 12, wherein the comparison model, when executed by the computer processor, identifies the selected script by executing the comparison model to output a nearest script that has a nearest executable script logic to the executable logic of the web page.

17. The system of claim 12, wherein the comparison model, when executed by the computer processor, identifies the selected script by:
   executing the comparison model to output a plurality of nearest scripts that have nearest executable script logics to the executable logic of the web page;
   selecting a subset of the plurality of nearest scripts;
   presenting the subset; and
   receiving, as the selected script, a selection from among the subset to identify the selected script.

* * * * *